United States Patent [19]
Tohyama

[11] Patent Number: 5,392,378
[45] Date of Patent: Feb. 21, 1995

[54] SPEED CONTROLLING SYSTEM AND A PREDICTOR

[75] Inventor: Yasuaki Tohyama, Kyoto, Japan

[73] Assignee: Matsushita Electric Industrial Co., Ltd., Osaka, Japan

[21] Appl. No.: 170,653

[22] PCT Filed: Oct. 29, 1991

[86] PCT No.: PCT/JP91/01473

§ 371 Date: Jun. 15, 1992

§ 102(e) Date: Jun. 15, 1992

[87] PCT Pub. No.: WO92/09016

PCT Pub. Date: May 29, 1992

[51] Int. Cl.[6] .............................................. H02P 5/00
[52] U.S. Cl. ......................................... 388/803; 318/632; 388/907.5; 388/902
[58] Field of Search ................ 318/632, 633, 254, 138, 318/439, 600, 567, 568, 571; 388/800, 803, 806, 807, 815, 902, 906, 907.5, 909, 930

[56] References Cited

U.S. PATENT DOCUMENTS

| | | | |
|---|---|---|---|
| 4,297,734 | 10/1981 | Laishley et al. | 318/571 |
| 4,563,623 | 1/1986 | Matsuka | 318/567 X |
| 4,743,821 | 5/1988 | Hall | 312/599 |
| 4,893,066 | 1/1990 | Stewart et al. | 318/600 |
| 4,925,312 | 5/1990 | Onaga et al. | 318/568.22 |
| 5,073,746 | 12/1991 | Sakamoto et al. | 318/618 X |
| 5,128,813 | 7/1992 | Lee | 318/561 |
| 5,187,417 | 2/1993 | Minnich et al. | 318/254 |

OTHER PUBLICATIONS

"System and Control", vol. 30, No. 1, pp. 34-41, 1986.

*Primary Examiner*—Jonathan Wysocki
*Attorney, Agent, or Firm*—Lowe, Price, LeBlanc & Becker

[57] ABSTRACT

A predictor (20) and a learning device (20) are newly provided to a conventional speed controlling system for a rotating body, according to the present invention. The predictor predicts an instantaneous speed error on the basis of a plurality of speed errors to enable elimination of a phase delay due to sampling. The learning device is effective to remove torque ripple components of a motor on the basis of the speed errors. As a result, it is possible to expand a speed controlling region of the motor and to decrease irregularlity in rotation of the motor to a great extent. The predictor solely makes it possible to obtain a present accurate rate of change of data previously sampled from a plurality of sampled data, whereby a phase delay due to digital processes may be prevented.

6 Claims, 7 Drawing Sheets

SPEED CONTROLLING SYSTEM AND A PREDICTOR

This application is a continuation of application Ser. No. 07/859,492, now abandoned.

Technical Field

The present invention relates to a speed controlling system which drives a rotating body on the basis of a speed detecting value obtained by cyclically measuring a speed detecting signal of the rotating body, and a predictor for obtaining an accurate present rate of change of data before sampling from a plurality of sampled data.

BACKGROUND ART

A speed controlling system of a digital type for a rotating body has been often used in a magnetic record reproducing system.

Hereinafter will be described an operation of a rotational speed controlling system of a capstan motor in the magnetic record reproducing system.

A sinusoidal wave signal is outputted from a frequency generator attached to a motor. This signal has a cycle depending on a rotational speed of the motor. This signal is amplified and shaped by a FG signal amplifier to be a square wave signal. An output of the FG signal amplifier is inputted to a speed error detector and the cycle of the inputted signal is quantized by a counter. A subtracter subtracts reference cycle data outputted from a reference value generator from the quantized count value, and a speed error is outputted therefrom. The detected speed error is compensated in relation with a gain in a speed controlling region by a digital filter, then is inputted into a D/A converter. An output from the D/A converter is supplied to a motor driving circuit to control a speed of the motor.

Next description will be on a control limit frequency in a speed controlling system for a rotating body, by representing each block in the above structure by transfer functions.

A transfer function of a motor is represented by a torque constant Kt (g-cm/A), a moment of inertia (g-cm.sec.sec/rad) and a Laplacian operator s. A rotational speed of the motor is converted into a speed detecting signal by a frequency generator having teeth of the number z per one rotation, and a cycle of the inputted signal is measured by an input-output sampler, a counter and a shift averaging element.

Supposing that a frequency of a reference clock supplied to the counter is Fck (Hz) and a sampling cycle is T (sec), a transfer function of the counter is given by a formula:

$$Gc = \frac{Kd \cdot (1 - e^{-sT})}{sT} \quad (1)$$

$$Kd = \frac{Fck \cdot T^2}{2 \cdot \pi} \quad (2)$$

A measured cycle value of the speed detecting signal quantized by the counter is subtracted a reference value to calculate a speed error. The calculated speed error is inputted to the digital filter having a transfer function Gf to be compensated in relation with a gain in a speed controlling area, then is supplied to a zero-order holder made up of an input buffer of the D/A converter.

A transfer function Gh of the zero-order holder is given by a formula:

$$Gf = \frac{1 - e^{-sT}}{sT} \quad (3)$$

An output of the zero-order holder is converted into an analogue voltage by the D/A converter having a conversion gain Kx and is supplied to a motor driving circuit having a transfer conductance gm (A/V). The output current from the motor driving circuit controls a speed of the motor.

The conversion gain Kx of the D/A converter is given by a formula:

$$Kx = \frac{Vcc}{2^n} \quad (4)$$

where
n: number of conversion bit; and
Vcc: a supplied voltage.

In the above transfer functions of the respective part, phase characteristics of the counter part and the holder depend on the sampling cycle T. The phase characteristics $\theta c$ and $\theta h$ of the counter part and the holder at an arbitrary frequency are respectively given on the basis of the formulae (1) and (3) by formulae:

$$\theta = \pi \cdot f \cdot T \quad (5)$$

$$\theta h = \pi \cdot f \cdot T \quad (6)$$

By the way, a stable operation of the controlling system requires, in general, a phase margin from 40 to 60 degrees in a frequency at which a gain of an open loop is 0 dB. However, an inertial term in an inertial block at that frequency becomes dominant so that a phase delay of 90 degrees occurs at that frequency. Therefore, required conditions to obtain a phase margin of 60 degrees at that frequency are given by the following formula:

$$|\theta c + \theta h| \leq \frac{\pi}{6} \quad (7)$$

Under the conditions, a control limit frequency Flim stably controllable the motor is represented using a FG frequency Ffg by a formula:

$$Flim = \frac{Ffg}{12} \quad (8)$$

As having been described, the control limit frequency stably controllable the motor is limited by the FG frequency. A multiplying circuit is provided to the speed error detector before inputting a speed detecting signal to reduce the sampling cycle to a half, thereby expanding the control limit frequency FG up to 1/6 of the FG frequency.

In order to employ the multiplying method, it is, however, necessary that a period of time of one cycle of the speed detecting signal is equal to or longer than twice a time period required from the detection of speed error to the outputting to the D/A converter.

In other words, in case that the FG frequency is relatively high, a limit value of the control limit frequency is theoretically 1/12 of the FG frequency as shown by the formula (8).

In the commercial VTR or the like, a direct driving system has been often used as a driving system for a capstan motor. However, torque ripples of the motor cause irregularity in rotation and wow and flutter are thus worsened.

The torque ripples depend on one rotational cycle of the motor and have typically a harmonic element of integral multiples of the rotational cycle.

As a method for removing the torque ripples depending on a rotational cycle of a motor by utilizing this peculiar property, there is reported an example where a repeated control (or a learning control) is employed ("System and Control", Vol. 30, No. 1, P34–41, 1986).

The control method employed a repeated control is effective to remove the torque ripples depending on a rotational cycle of a motor, but requires a lot of memories or shift registers to accomplish a learning mechanism and further a compensator made up of a complex higher grade filter or the like to obtain stability in the control system. It is, thus, costly to perform the repeated control method in the conventional system.

An object of the present invention is to overcome the above problems and, therefore, to provide a speed controlling system enabling a stable speed control even if the multiplying method is unadoptable therein.

DISCLOSURE OF THE INVENTION

The present invention, therefore, provides a speed controlling system comprising a speed detecting means for detecting an average speed of a rotating body in each measuring section by cyclically measuring a speed detecting signal corresponding to a speed of the rotating body, a speed error calculating means for calculating an average speed error from output data of the speed detecting means and reference cycle data, a predicting means for predicting an instantaneous speed error from an average speed error corresponding to a specific measuring section and a preceding average speed error, an error averaging means for accumulating and adding outputs of the predicting means to output average value data, a memory selecting means for selecting a specific memory, an error storing means for adding output data of the error averaging means and data of the specific memory selected by the memory selecting means to store the result in the memory, a compensating error calculating means multiplying the data of the specific memory selected earlier than the memory by a constant smaller than 1 and adding output data of the instantaneous error predicting means to the multiplied result, and a driving means for driving the rotating body on the basis of output data of the compensating error calculating means.

Accordingly, the present invention provides a speed controlling system having the above structure, in which a phase margin may be increased than the conventional system and a cyclic disturbance may be noticeably suppressed.

BEST MODE OF CARRYING OUT THE INVENTION

Hereinafter, preferred embodiment of the present invention will be described with reference to the accompanying drawings.

Figure 1:
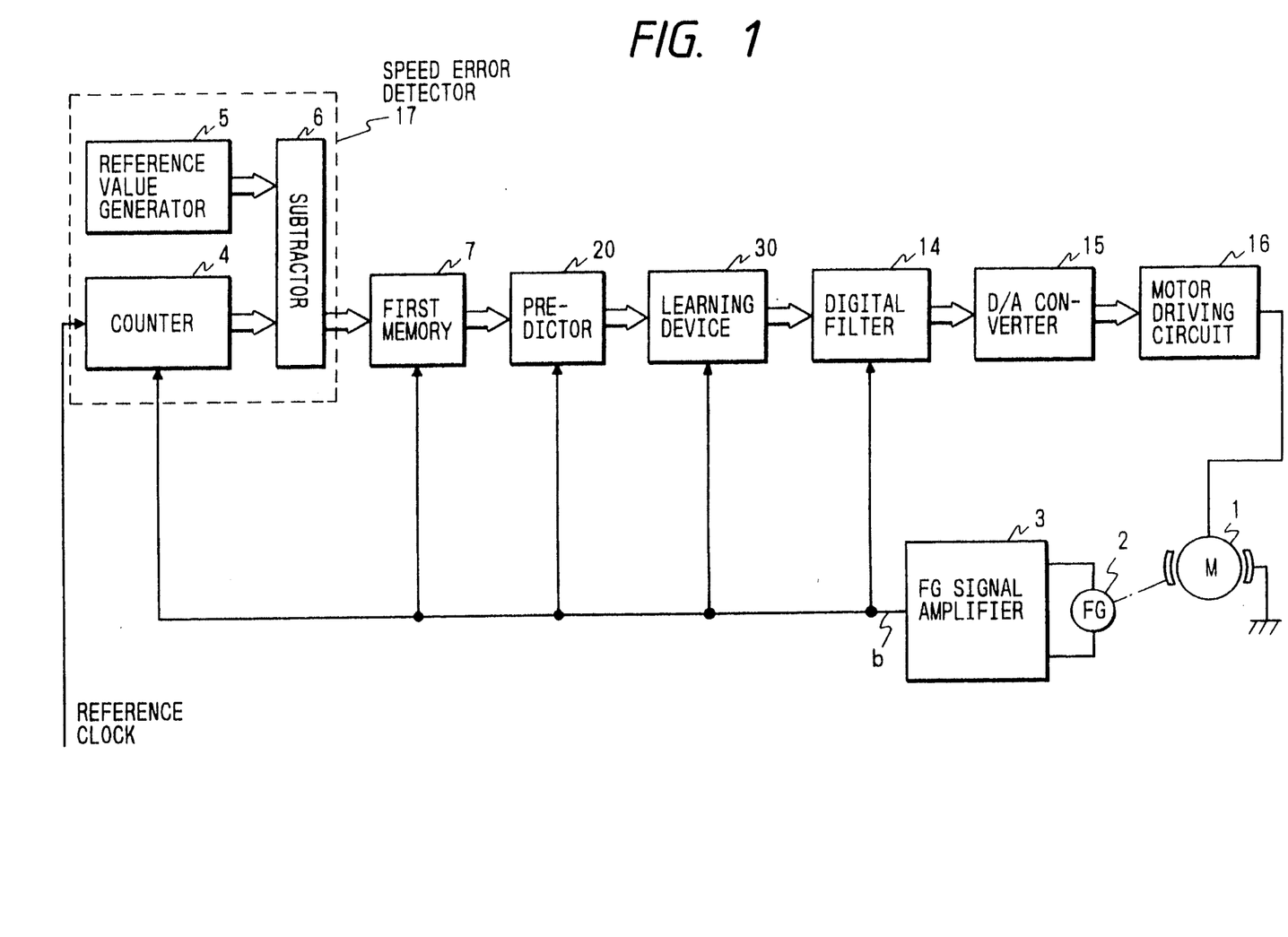
FIG. 1 is a block diagram showing a structure of a speed controlling system of an embodiment according to this invention.
Figure 2:
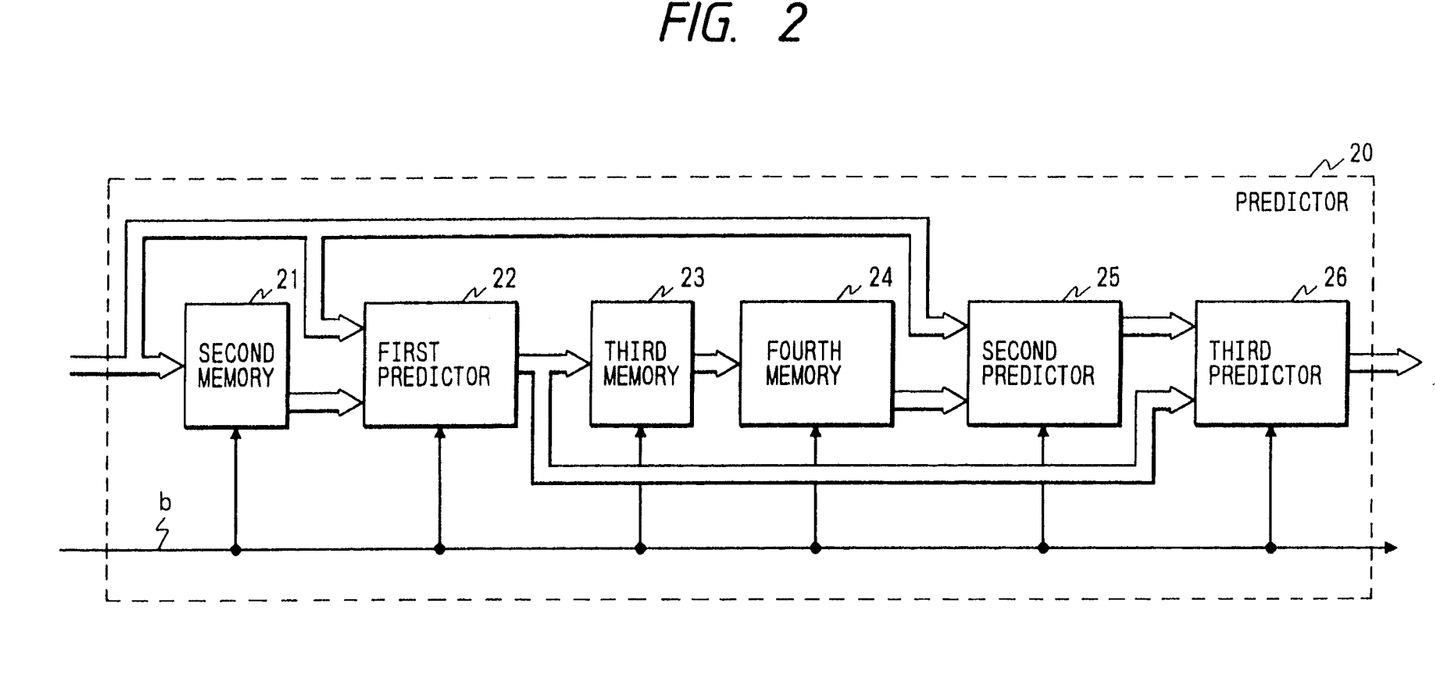
FIG. 2 is a block diagram showing an internal structure of a predictor 20 of the embodiment shown in FIG. 1.
Figure 3:
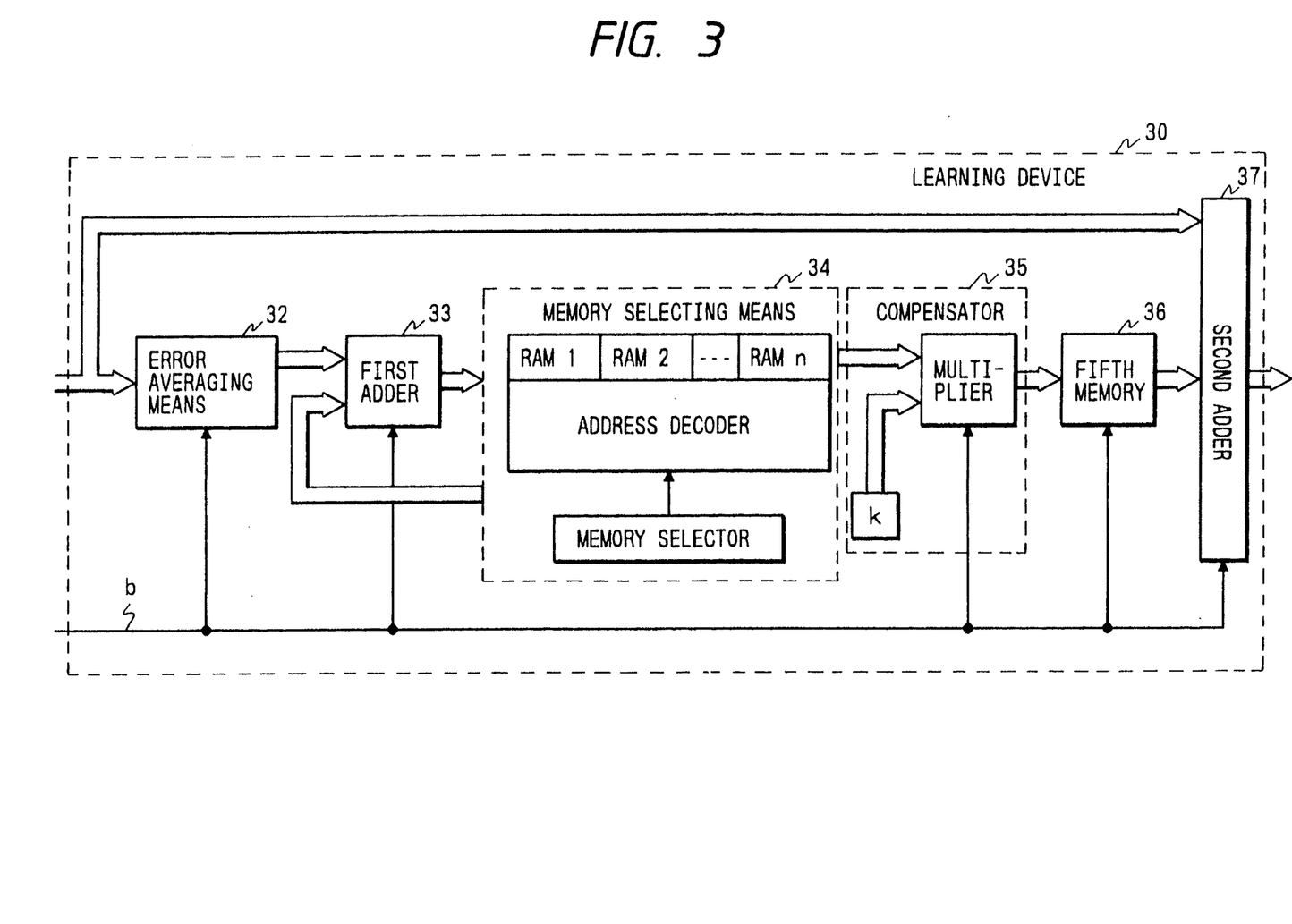
FIG. 3 is a block diagram showing an internal structure of a leaning device 30 of the embodiment shown in FIG. 1.

FIG. 1 is a basic block diagram showing a speed controlling system of an embodiment according to the present invention. FIG. 2 is a detailed diagram of a predictor 20 shown in FIG. 1. FIG. 3 is also a detailed diagram of a learning device 30 shown in FIG. 1.

Referring now to FIG. 1, an output signal b from a FG signal amplifier 3 is inputted to a counter 4 to be quantized by a reference clock. Count data of the counter 4 and reference value data of a reference value generator 5 are supplied to a subtracter 6. The count data of the counter 4 are subtracted the reference value data, and the arithmetical resulting data are supplied to a first memory 7. Output data of the first memory 7 are inputted to the predictor 20 and output data from the predictor 20 are supplied to a learning device 30.

Referring to FIG. 2, a first predictor 22 is supplied data from the first memory 7 and a second memory 21, and a predictive operation is carried out. The data of the first memory 7 are then supplied to the second memory 21. A second predictor 25 is supplied data from a fourth memory 24 and the first memory 7, and a predictive operation is carried out. Data of a third memory 23 are then supplied to the fourth memory 24. A third predictor 26 is supplied output data from the second predictor 25 and the first predictor 22, and predictive operation is carried out. Results of the predictive operation are supplied to a learning device 30.

FIG. 3 shows that the results of the predictive operation set forth above are supplied to a second adder 37 and an error averaging means 32. Output data averaged by the error averaging means 32 are inputted to a first adder 33. The first adder 33 adds the output data from the error averaging means 32 to data of a specific memory selected among memories by a memory selecting means 34, and added results are stored into the specific memory. A compensator 35 multiplies the specific memory selected by the memory selected means 34 by a multiplier k, and outputs computed results to a fifth memory 38. The second adder 37 adds the above operated results, i.e., output data from the third predictor 28 and output data from the fifth memory, then outputs to a digital filter 14.

Incidentally, the predictor 20 is made up of the second memory 21 to the third predictor 28, and a learning device 30 is made up of an error averaging means 32 to the second adder 37, to which an output signal b from the FG signal amplifier 3 is inputted as a control signal.

The output signal b from the FG signal amplifier 3 is also inputted as a sampling signal to the digital filter 14.

Next, description will be made on an operation of a speed control system having the above structure, referring to FIGS. 1 to 4.

Figure 4:
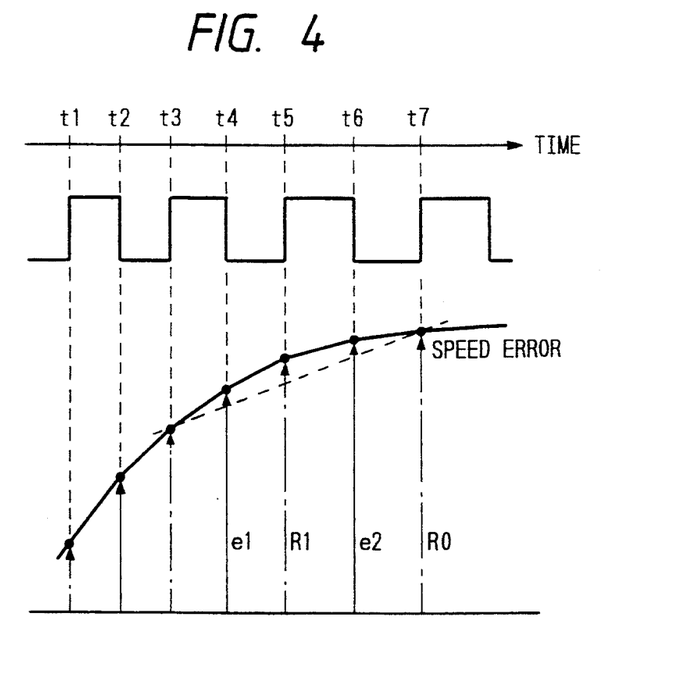
FIG. 4 is a time chart illustrating an operation of the speed control system of the embodiment.

FIG. 4 depicts a relation of the FG signal b with speed error of a motor 1, where the rotational speed of the motor is gradually decreased.

When an leading edge of the FG signal b arrives, data of the first memory 7 are transferred to the second memory 21, and data of the third memory 23 are transferred to the fourth memory 24. Namely, the second memory 21 and the fourth memory 24 are always stored data one time ahead of the data inputted to the third memory 23, in order to prepare predictive operations in the first predictor 22 and the second predictor 25.

In the first predictor 22, the data of the first memory 7 is multiplied by 3, the multiplied result is subtracted by the data of the second memory 21, then the subtracted result is divided by 2 (that is, the output of the first memory 7 is subtracted the output of the second memory 21, the subtracted result is multiplied by ½, then the multiplied result is added the output of the first memory 7). The result of this operation is stored in the third memory 23. In the second predictor 25, data of the first memory 7 is multiplied by 2 and the multiplied result is subtracted data of the fourth memory 24 (that is, the output of the first memory 7 is subtracted the output of the fourth memory 24, and the subtracted result is added the output of the first memory 7). In the third predictor 26, the output data of the second predictor 25 and the output data of the first predictor 22 are added and averaged, and the computed resulting value is outputted.

Now referring to FIG. 4, the above sequence of the process will be illustrated.

At time t7, it is assumed that when the leading edge of the FG signal b arrives, a process in the speed detector 17 has been completed. At this time, the first memory 7 is stored speed error data depending on a mean speed of the motor 1 during time t5 to t7. The second memory 21 is also stored speed error data depending on a mean speed of the motor during time t3 to t5.

Assuming that instantaneous speeds during two cycles of the speed detecting signal of the motor i from time t3 to t7 can be approximated to a straight line, the data stored in the first memory 7 represent an instantaneous speed error e2 at time t6, i.e., at the mid-point between time t5 and time t7, while the data of the second memory 21 represent an instantaneous speed error e1 at time t4, i.e., at the mid-point between time t3 and time t5.

An instantaneous speed error predicting value R0 at time t7 is accordingly given by a formula:

$$R0 = e2 + \frac{(e2 + e1)}{2} \qquad (9)$$

In other words, an instantaneous speed error predicting value R0 represented by the formula (9) is outputted from the first predictor 22.

Meanwhile, the fourth memory 24 is stored an instantaneous speed error predicting value R1 at time t5. On the basis of an instantaneous speed error predicting value R1 at time t5 and an instantaneous speed error e2 at time t6, the second predictor 25 outputs an instantaneous speed error predicting value R2 given by a formula:

$$R2 = e2 + (e2 - R1) \qquad (10)$$

Namely, the instantaneous speed error predicting value R1 having been calculated the last time (at time t5) is reflected to the present computation.

The third predictor 26 adds the instantaneous speed error predicting value R0 to the instantaneous speed error predicting value R2 as calculated in the above manner and averages them, then outputs a final instantaneous speed error predicting value R.

From the above, when a transfer function Pr1 of the first predictor 22 is represented by using a Z operator, a formula is given:

$$Pr1 = \frac{3 - Z^{-1}}{2} \qquad (11)$$

In a similar manner, a transfer function Pr2 of the second predictor 25 is represented by a formula:

$$Pr2 = \frac{4 - 3Z^{-1} + Z^{-2}}{2} \qquad (12)$$

Therefore, a transfer function Prn of the third predictor 26 is represented by a general formula:

$$Prn = \frac{a \cdot Pr1 + b \cdot Pr2}{a + b} \qquad (13a)$$
$$= \frac{a \cdot (3 - Z^{-1}) + b \cdot (4 - 3Z^{-1} + Z^{-2})}{2 \cdot (a + b)}$$

provided arbitrary real numbers a,b meet the following conditions:

$$a + b = 1,$$

$$a \geq 0,$$

and $$b \leq 0.$$

Here, if a=b=0.5 is selected, a transfer function Pr3 of the third predictor 26 becomes:

$$Pr3 = \frac{(Pr1 + Pr2)}{2} \qquad (13)$$
$$= \frac{7 - 4Z^{-1} + Z^{-2}}{4}$$

Namely, a process in the predictor 20 in FIG. 1 may be performed by carrying out the process shown by the formula (13).

Here, a=b=0.5 is so selected that the coefficient of the numerator in the formula (13a) becomes an integer, but a=1 or b=1, for example, may be selected, as not limited to the above example. However, when b>a is selected, a weight of the data two sampling rounds before is, in general, exceedingly increased so that a phase margin is increased but a gain margin in a high region is slightly decreased. To the contrary, when a>b is selected, the phase margin is not noticeably increased but the gain margin in the high region is little decreased. It is, therefore, necessary to select the a and b depending on the object. In other words, it is necessary to select suitable weighting coefficients of a and b, depending on such the object that whether the phase margin is ensured or the gain margin is ensured.

Next description will be made on an operation of the learning device 30. Assuming that the number of tooth of the rotating body is N, speed detecting signals are detected N times during one rotational cycle. And, assuming that the number of averaging is Navg, the number of RAMs required to the learning RAMs will become Nr(=N/Navg), which enables the number of the RAM N required in the conventional device to be reduced by 1/Navg.

When obtaining an output from the third predictor the error averaging means 32 starts cumulative addition of the errors. Until the averaging of the errors accumulated and added is completed, that is, during the number of the accumulative addition remains (n<Navg), the learning RAMs are not selected, and the data of the fifth memory 36 and the output of the predictor 28 are added, then the result is outputted to the digital filter 14. After the cumulative addition of the errors in the error averaging means 32 is completed, that is, the number of the accumulative addition becomes (n=Navg), the error averaging means 32 averages the accumulated and added errors. Namely, when an output of the third predictor 26 is assumed to be Ei, an output Eavg in the error averaging means 32 is represented by a formula:

$$Eavg = \frac{1}{Navg} \sum_{i=1}^{Navg} Ei \qquad (14)$$

When the averaging of the errors is finished, the error averaging means 32 outputs the averaged error Eavg. On the other hand, the memory selecting means 34 selects a specific RAM among the learning RAMs.

Hereinafter will be described a manner for selecting a RAM. Here, the RAM which has been selected last time is assumed to be RAMk−1. At this time, a pointer has been incremented so that a pointer value np is (np=k). In consequence, a RAMk shown by a pointer value (np=k) is selected this time and the pointer is again incremented. In which case, if the incremented pointer value np is larger than the number of RAM Nr, i.e., (k+1>Nr), the pointer is reset.

In the above process, it is possible to cyclically select RAM 1 to RAMNr on the basis of a rotational cycle of the motor 1 as a mode.

When the RAMk is selected, the output of the error averaging means 32 and the data of the selected RAMk are added, and the computed result is stored in the RAMk. Then the leaning operation in the learning device is terminated.

Next description will be on a computing manner of error data actually outputted to the digital filter 14.

The RAMk−1 which is one round ahead of the RAMk having learned this time is selected by the memory selecting means 34. In order to compensate a phase delay caused by the motor 1, the RAMk−1 one round preceding the RAMk which has learned this time is selected.

Hereinafter, description will be made on a calculating manner of a phase quantity for making the phase take a lead.

If the phase leads by a quantity corresponding to one RAM, a dead time Tinc of the lead corresponding to the quantity of the phase lead is given by a formula:

$$Tinc = \frac{Navg}{Ffg} \qquad (15)$$

In a compensator 35, the data of the RAM−1 selected by the memory selecting means 34 is multiplied by a predetermined constant k, and the result is stored in the fifth memory 36. It is possible to select an arbitrary value smaller than the constant k. An effect of the learning become greater as the constant K approaches 1, but it becomes difficult to ensure the stability in the control system.

Figure 5:
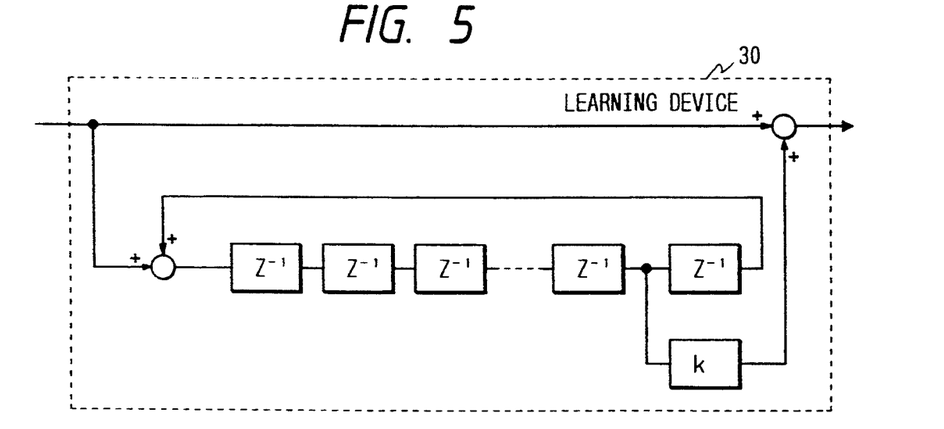
FIG. 5 is a block diagram of the learning device 30 of the embodiment.

FIG. 5 is a block diagram showing the leaning device 30 in FIG. 1, using Z operators. A transfer function GL in the learning device is represented using the Z operators and Lapacian operators s by a formula:

$$GL = \frac{1 - (1 - e^{ST} \cdot k)Z^{-Nr}}{1 - Z^{-Nr}} \qquad (16)$$

In accordance with the formula (16), as the constant k approaches 1, the second term of the denominator approaches zero, but as the constant k becomes smaller than 1, the gain GL approaches 1 within a control band in a servo system so that it is readily understood that the learning becomes ineffective.

Since the learning effect and the stability in the servo system is in a relationship of tradeoff, the constant k is set at a value equal to or more than 0.9, in general.

The data of the fifth memory 36 and the output of the third predictor 26 are then added and the result is outputted to the digital filter 14.

As having been set forth above, a compensation error is calculated from the output of the predictor 20 in the processes in each part of the learning device 30.

Figure 6:
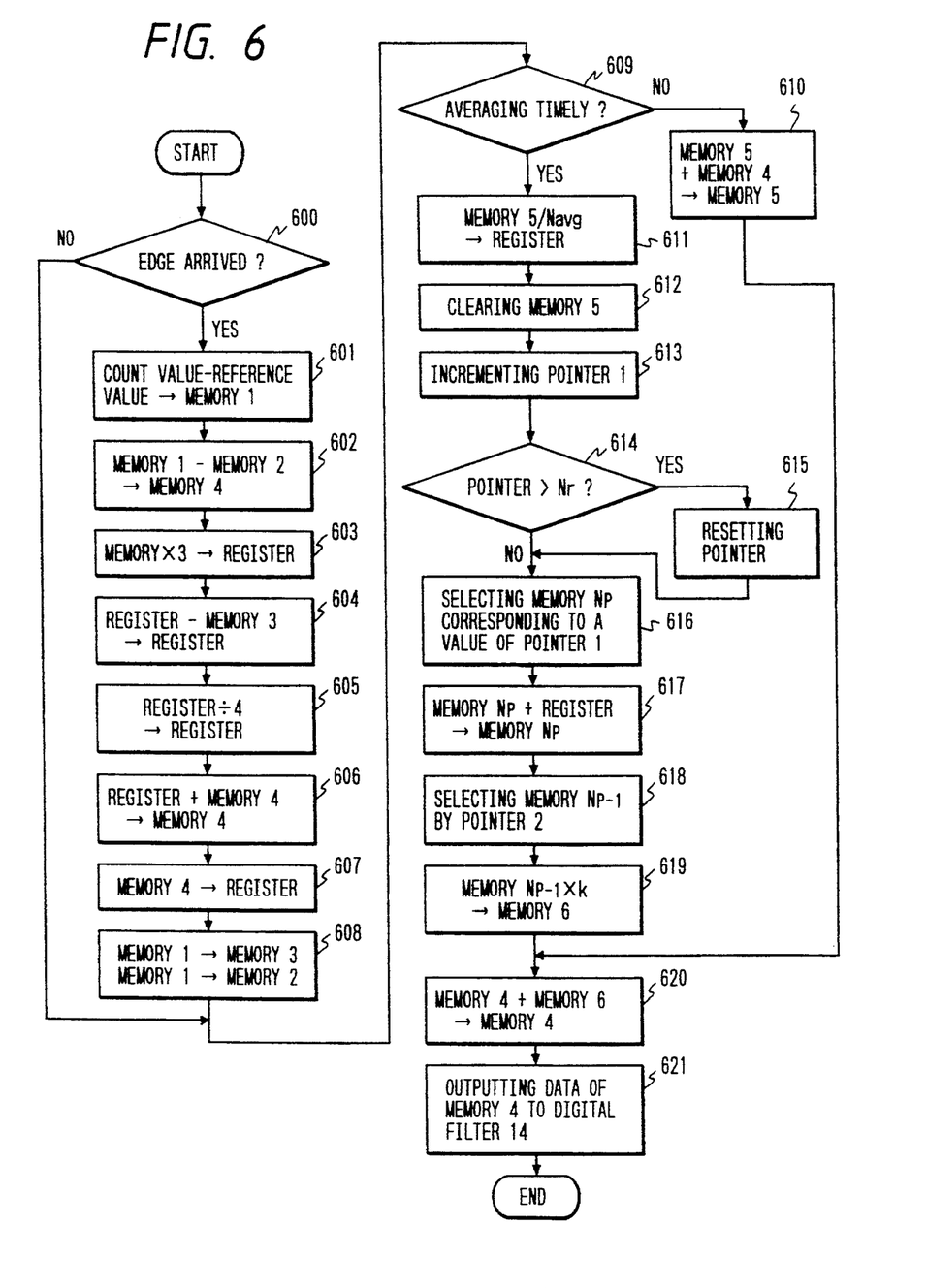
FIG. 6 is a flow chart for carrying out processes of the predictor 20 and the learning device 30.
Figure 7:
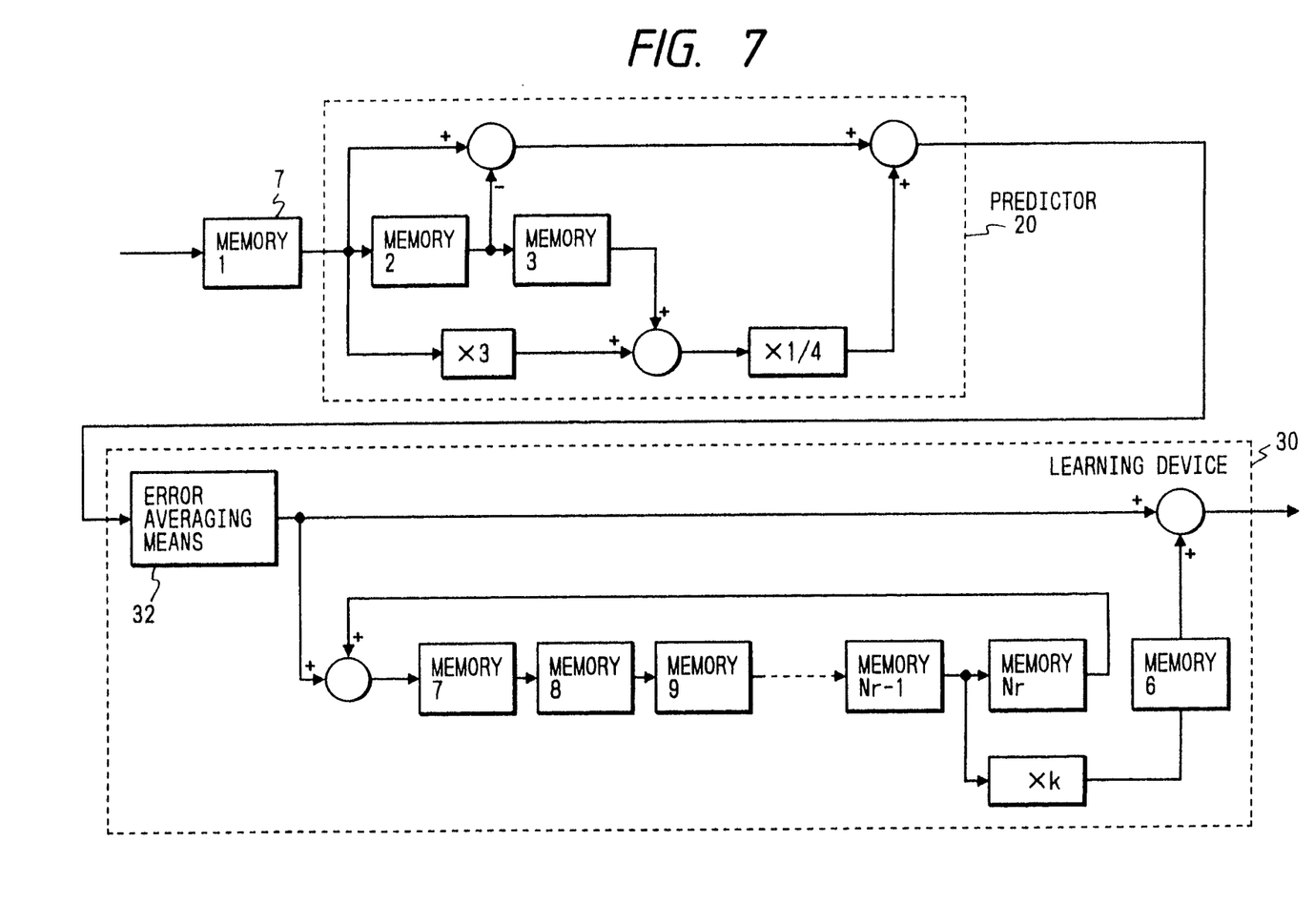
FIG. 7 is a block diagram corresponding to the flow chart shown in FIG. 6.

Assuming that the processes in the predictor 20 and learning device 30 as above illustrated are performed by means of software, FIG. 6 shows a flow chart which realizes the processes in the respective block diagrams and FIG. 7 shows a block diagram corresponding to the flow chart in FIG. 6 to describe the processes.

A count value used here is an output of the counter 4 in FIG. 1 and a reference value is an output of a reference value generator 5 in FIG. 1. Memories 1 to Nr correspond to memories 1 to Nr in FIG. 7, provided a memory 4 is temporary. Operations in the subtracter 6, the predictor 20 and the learning device 30, and the digital filter 14 are readily feasible in an arithmetic logical unit (ALU) provided in a microprocessor.

With the aim of simplifying the operations, the formula (13) is deformed in a formula (17):

$$Pr3 = 1 - Z^{-1} + \frac{3 + Z^{-2}}{4} \qquad (17)$$

At the beginning, whether a leading edge of an output signal b of the FG signal amplifier 3 in FIG. 1 has arrived or not is judged in a processing branch 600. If the leading edge has arrived, a count value is subtracted a reference value in a processing branch 601, and the result is transferred to a memory 1. If the leading edge has not been arrived yet, the process is finished. The data of the memory i are subtracted data of a memory 2 in a processing branch 602, and the subtracted result is transferred to a memory 4. Further, three times of the data of the memory 1 are transferred to a register in a processing block 603. In this process, the data of the memory 1 are once transferred to the register, then two times of the data of the memory 1 are transferred to the register once more, so three times of the data of the memory 1 may be transferred to the register without using a multiplying command. The value of the register is added data of a memory 3 in a processing block 604, and the result is also transferred to the register. A value in the register is shifted twice to the right in a processing block 605, and the result is transferred to the register. The value in the register is added the data of the memory 4 in a processing block 606, and the result is stored in the memory 4.

The data of the memory 4 are transferred to the register in a processing block 807 to prepare the next operation in the learning device 30.

The data of the memory 2 are transferred to the memory 3, and the data of the memory 1 are transferred to the memory 2 for preparing the next operation in the predictor 20 in a processing block 608.

By way of the simple operations through the processing branch 600 to the processing branch 608, the process in the predictor 20 in FIG. 1 may be performed.

Next description will be on processes in the learning device 30.

The error averaging means 32 comprises a processing branch 609 to a processing branch 612. In the processing branch 609, whether an averaging of the errors accumulated and added is timely or not is judged. If the averaging is untimely, the data of the memory 4 are added to the data of the memory 5 in a processing block 610, and the results are stored in the memory 5. The next step jumps to a processing block 620.

If the averaging is timely, the data of memory 5, accumulated and added, are divided by the averaging number Navg in the processing block 611. The divided result is stored in the register. Incidentally, the averaging number is also feasible in a shift operation by raising 2 to the n power. In a processing block 612, the memory 5 for cumulation and addition is cleared to be prepared for the next cumulation and addition.

A memory selecting means 34 comprises processing blocks 613 to 618.

In the processing block 613, the pointer 1 is incremented. Next, whether the value of the point 1 is larger than the number Nr of the learning RAMs is judged in a processing block 614. If the value of the pointer is larger than the number Nr of the learning RAMs, the pointer is reset in a processing block 615. The next step jumps to a processing block 616. If the value of the pointer is smaller than the number Nr of the learning RAMs, a memory Np corresponding to the pointer value is selected in a processing block 616. In a processing block 617, the selected memory Np is added a register value, and the result is once more stored in the memory Np. In the processing block 618, a memory Np−1 is selected by a pointer 2 having a value smaller by 1 than the pointer 1.

A compensator 35 comprises a processing block 619. In the processing block 619, the selected memory Np−1 is multiplied by a constant k, and the result is stored in a memory 6. Here, the constant k selects a value enabling a shift operation. In a processing block 620, the data of the memory 4 and the data of the memory 6 are added, and the added result is stored in the memory 4. In the above manner, the processes in the learning device 30 is terminated.

In a final step, the data of the memory 4 is outputted to the digital filter 14 in a processing block 621.

In the series of the arithmetic processes, additive and subtractive operations and shift operations are performed instead of multiplying commands so that a time required for the processes may be shortened and dead time elements are thus hardly occurred.

Figure 8:
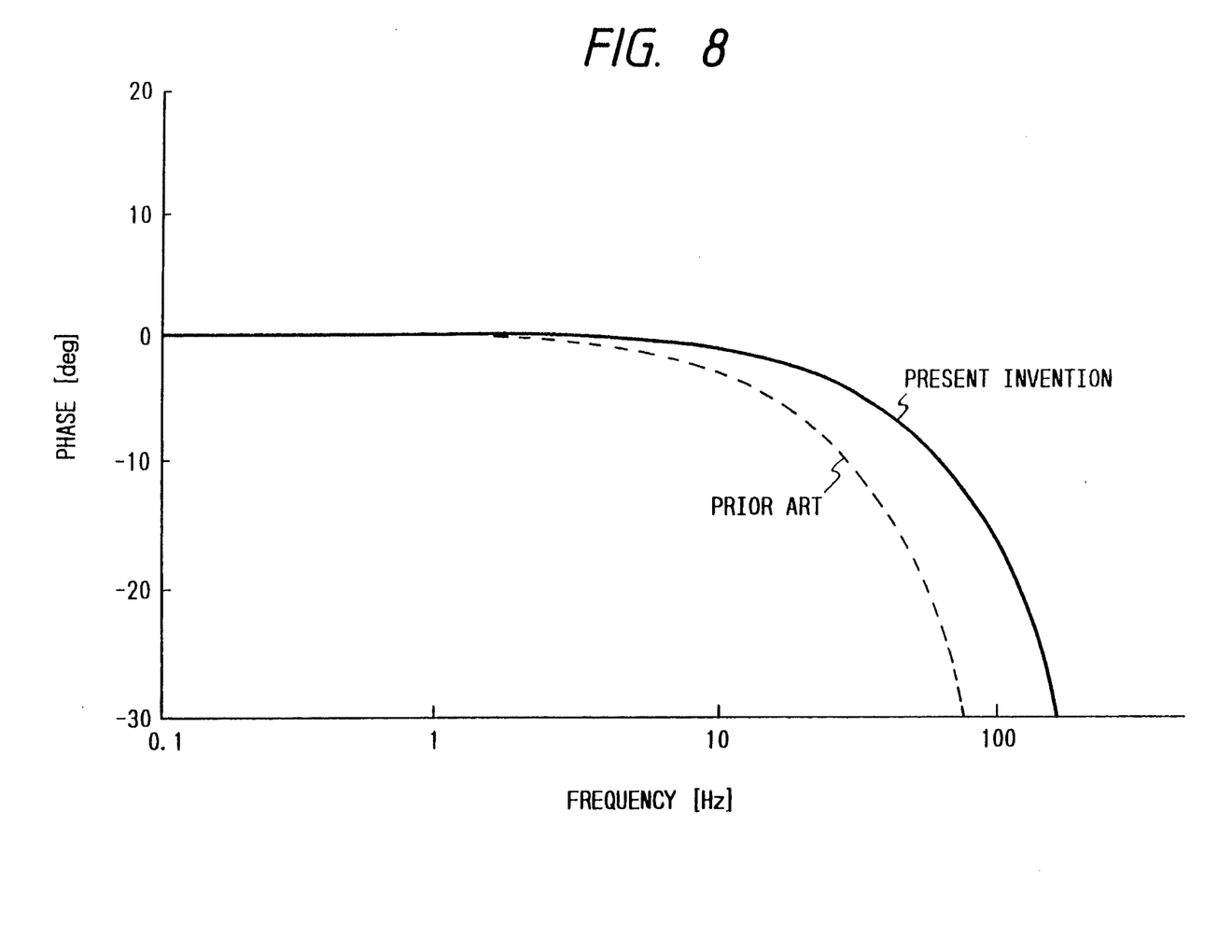
FIG. 8 is a graph showing phase characteristics of the conventional system and the system of the embodiment according to this invention, comparing with each other.

FIG. 8 shows a result of simulation made on phase characteristics of "the counter 4 and the holder" in the conventional system and "the predictor 20 and the holder in this embodiment according to this invention, where the sampling cycle 1 is 1 ms. Wherein, a quantity of phase delay in this embodiment is a half of the conventional system.

Therefore, by carrying out the predicting operation shown by the formula (14) in a soft-wear operation according to the present invention, the quantity of phase delay in the counter part shown in the formula (5) may be theoretically null.

The phase characteristics in this invention is represented by a formula:

$$\theta c = 0 \tag{5'}$$

From the formulae (5)', (6) and (7), a control limit frequency Flim which may stably control the motor is represented using the FG frequency Ffg by a formula:

$$Flim = \frac{Ffg}{6} \tag{8'}$$

According to the present invention, by carrying out the predicting operation shown by the formula (14) in the soft-wear operation, the phase delay in the counter part shown in the formula (5) may be eliminated.

As a result, the control limit frequency stably controllable the motor may be extended up to 1/6 of the FG frequency, without using the multiplying method.

Further, disturbance in synchronization with a rotational cycle of the rotating body may be suppressed by the learning device 30, whereby the speed of the rotating body may be controlled more stably than in the conventional system.

Industrial Applicability

As having been described, the predictor 20 and the learning device 30 are newly added to the conventional system so that it becomes possible to eliminate a phase delay due to the sampling by estimating a present instantaneous speed error from a plurality of speed errors inputted to the predictor 20, and to remove torque ripple components depending on a rotational cycle of a rotating body from the instantaneous speed error by learning device 30, thereby largely suppressing disturbance.

It is also possible to expend the control band while maintaining the stability up to a frequency two times the conventional system.

Specifically only to the predictor 20, it is possible to obtain an accurate present rate of change of the data before the sampling from a plurality of sampled data.

The processes in the predictor 20 and the learning device 30 are performed in softwear operations so that it is unnecessary to add any hardwear. This is extremely effective in practise.

I claim:
1. A speed controlling system comprising:
   a speed detecting means for detecting an average speed of a motor in each measuring section by cyclically measuring a speed detecting signal cor- responding to a speed of the motor and producing an average speed signal;

a speed error calculating means for calculating an average speed error responsive to the average speed signal received from the speed detecting means and reference cycle data and producing an average speed error signal;

a predicting means for predicting an instantaneous speed error from the average speed error signal received from said speed error calculating means, the instantaneous speed error corresponding to a specific measuring section and a preceding average speed error, and for producing a predicted signal;

an error averaging means for accumulating and adding the predicted signal received from the predicting means and generating average value data;

a memory selecting means for selecting a specific memory storing data;

an error storing means for adding the average value data of the error averaging means and the data of the specific memory selected by the memory selecting means producing an added result and storing the added result in the memory;

a compensating error calculating means multiplying the data of the specific memory by a constant smaller than 1 generating a multiplied result and adding the predicting signal of the predicting means to the multiplied result generating a control signal; and a driving means for driving the motor on the basis of the control signal received from the compensating error calculating means, wherein the predicting means, the error averaging means, the error storing means and the compensating error calculating means receive data indicating the analog quantity which is sampled, and wherein, responsive to the data indicating the analog quantity which is sampled, the predicting means outputs the predicted signal, the error averaging means outputs the average value data, the error storing means outputs the added result and the compensating error calculating means outputs the control signal.

2. A speed controlling system according to claim 1, wherein the predicting means predicts the instantaneous speed error from average speed errors generated by three measuring sections connected in series.

3. A speed controlling system according to claim 1, wherein the memory selecting means selects the specific memory responsive to a pointer for each measuring cycle of the speed detecting signal the pointer being incremented for each cycle of the speed detecting signal, and the memory selecting means resetting the pointer when a value of the pointer exceeds a maximum value corresponding to one rotation of the motor.

4. A predictor for predicting change of an analog quantity at the point of the latest sampling of a device, comprising:

a data sampler for receiving two groups of data obtained by sampling said analog quantity continuously varying in two points;

a subtractor, coupled to said data sampler for calculating a first difference value of said two groups and outputting said first difference value as first data in accordance with a first sampling period and second data in accordance with a previous sampling period;

a first memory, coupled to said subtractor, for storing the second data obtained the previous sampling period before the first data;

a first predictor coupled to said subtractor and said first memory for receiving the first data and the second data, and generating third data by adding half of a second difference value between the first data and the second data to the first data in accordance with the first sampling period and generating fourth data in accordance with the previous sampling period;

a second memory, coupled to said first predictor, for storing the fourth data obtained the previous sampling period before the third data;

a second predictor coupled to said subtractor and said second memory for receiving the first data and the fourth data, the second predictor outputting fifth data obtained by adding the first data to a third difference value between the first data and the fourth data;

a third predictor coupled to said first predictor and said second predictor for calculating and outputting an average value weighted with the third data and the fifth data representing said change of the analog quantity at the point of the latest sampling; and driving means for driving the device on the basis of the average value received from said third predictor.

5. A predictor for predicting instantaneous speed of a motor at the point of the latest sampling comprising:

a data sampler for receiving two groups of data obtained by sampling a speed of said motor continuously varying in two points;

a subtractor, coupled to said data sampler for calculating a first difference value of said two groups and outputting said first difference value as first data in accordance with a first sampling period and second data in accordance with a previous sampling period;

a first memory, coupled to said subtractor, for storing the second data obtained the previous sampling period before the first data;

a first predictor coupled to said subtractor and said first memory for receiving the first data and the second data, and generating third data by adding half of a second difference value between the first data and the second data to the first data in accordance with the first sampling period and generating fourth data in accordance with the previous sampling period;

a second memory, coupled to said first predictor, for storing the fourth data obtained the previous sampling period before the third data;

a second predictor coupled to said subtractor and said second memory for receiving the first data and the fourth data, the second predictor outputting fifth data obtained by adding the first data to a third difference value between the first data and the fourth data;

a third predictor coupled to said first predictor and said second predictor for calculating and outputting an average value weighted with the third data and the fifth data representing said instantaneous speed of the motor at the latest sampling; and driving means for driving the motor on the basis of the average value received from said third predictor, wherein the first memory, the first predictor, the second memory, the second predictor and the third predictor receive data indicating the speed of the motor, and wherein the first memory, the first predictor, the second memory, the second predictor and the third predictor output the first, second, third, fourth and fifth data respectively responsive to the data indicating the speed of the motor.

6. A speed controlling system according to claim 1, wherein said predicting means includes a means for calculating said instantaneous speed error by a formula:

$$Vi(n) = \{7Vm(n) - 4Vm(n-1) + Vm(n-2)\}/4$$

where
- Vi(n): said instantaneous speed error;
- vM(n): a latest average speed error;
- Vm(n−1): an immediately preceding average speed error; and
- Vm(n−2): a preceding average speed error.

* * * * *